(12) United States Patent
Marx et al.

(10) Patent No.: US 9,475,458 B2
(45) Date of Patent: Oct. 25, 2016

(54) ELECTRIC STEERING COLUMN LOCK SYSTEM

(71) Applicant: Nissan Motor Co., Ltd., Kanagawa (JP)

(72) Inventors: Thilo Marx, Villingen-Schwenningen (DE); Damien Vagney, Villingen-Schwenningen (DE); Kenjirou Hayashi, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/772,507

(22) PCT Filed: Mar. 4, 2013

(86) PCT No.: PCT/EP2013/000618
§ 371 (c)(1),
(2) Date: Sep. 3, 2015

(87) PCT Pub. No.: WO2014/135173
PCT Pub. Date: Sep. 12, 2014

(65) Prior Publication Data
US 2016/0001740 A1 Jan. 7, 2016

(51) Int. Cl.
*B60R 25/0215* (2013.01)
(52) U.S. Cl.
CPC ............................... *B60R 25/02153* (2013.01)
(58) Field of Classification Search
CPC ................................................ B60R 25/02153
See application file for complete search history.

(56) References Cited

U.S. PATENT DOCUMENTS

| | | | | |
|---|---|---|---|---|
| 7,021,093 | B2* | 4/2006 | Fukatsu | B60R 25/02153 70/186 |
| 7,891,221 | B2* | 2/2011 | Sugimoto | B60R 25/02153 70/186 |
| 8,047,028 | B2* | 11/2011 | Farmer | B60R 25/02153 292/144 |
| 2004/0074266 | A1 | 4/2004 | Zillmann | |
| 2009/0064739 | A1 | 3/2009 | Trischberger et al. | |
| 2012/0260701 | A1* | 10/2012 | Okada | B60R 25/02153 70/183 |
| 2014/0124282 | A1* | 5/2014 | Laval | B60R 25/02153 180/287 |

FOREIGN PATENT DOCUMENTS

| | | |
|---|---|---|
| DE | 102 47 803 B3 | 1/2004 |
| DE | 102 47 802 B3 | 2/2004 |
| EP | 2 025 567 A2 | 2/2009 |
| WO | 2011/104017 A1 | 9/2011 |

* cited by examiner

*Primary Examiner* — Darlene Condra
(74) *Attorney, Agent, or Firm* — Osha Liang LLP

(57) ABSTRACT

A locking device for a motor vehicle having a steering wheel column has a housing, a worm wheel cover, a blocking bolt that locks a steering wheel shaft in the steering wheel column, wherein the blocking bolt is movable between a first and a second position, a drive that moves the blocking bolt from the first position to the second position, a latching element that latches the blocking bolt, a mechanical activation mechanism that activates the latching element, and that has a trigger element, and a pushing element. In the first position, the blocking bolt is in blocking engagement with the steering wheel shaft. In the second position, the blocking bolt is disengaged from the steering wheel shaft. The latching element comprises a pin, and an opening is disposed in the blocking bolt for engagement with the pin.

6 Claims, 4 Drawing Sheets

ELECTRIC STEERING COLUMN LOCK SYSTEM

BACKGROUND

1. Technical Field

The invention relates to a locking device for a motor vehicle.

2. Related Art

Conventional locking devices in this technical field for motor vehicles usually have a blocking bolt, which is movable between a first and a second position for locking the steering wheel shaft in the steering wheel column. In the first position the blocking bolt can be brought into blocking engagement with the steering wheel shaft and in the second position the blocking bolt is disengaged from the steering wheel shaft. The locking device furthermore usually has a drive to move the blocking bolt, which is located in a housing. The blocking bolt is part of the steering wheel column and is integrated in particular in the steering wheel column. For example such a blocking device is described in the WO 2011/104017 A1. DE 102 47 803 B3 discloses a locking device that includes a latching device for latching the blocking device, that is sensitive to manipulation of the housing.

SUMMARY

Conventional locking devices may be vulnerable to theft attacks. Such attacks may include, for example, removing the housing, sideward moving of the worm gear housing, or tilt over of the worm gear cover.

One or more embodiments of the present invention improves the steering wheel locking devices of vehicles, especially to improve the security against theft.

To secure the locking device against theft, according to one or more embodiments of the invention, a latching element for latching the blocking bolt and a mechanical activation mechanism is provided.

Using the combination of a latching element and an activation mechanism, initiated by manipulating the housing and/or the worm wheel cover of the locking device a high security standard is achieved. Since a third party with thief intention is manipulating the housing and/or the worm wheel cover by moving or deformation or destruction the activation mechanism initiates the latching element to latch the blocking bolt of the locking device and so the blocking bolt is prevented for undesired release.

The activation mechanism operates mechanically. For this reason, the latching device may not be overcome by interruption of any electric control circuit or the like.

According to one or more embodiments of the present invention, activation of a latched pin position is released by movement of a trigger element in at least one of at least two different trigger directions.

According to one or more embodiments of the present invention, advantageously, the latching element has a latching position with interlocking engagement with the blocking bolt and a unlatching position disengaged from the blocking bolt. Since the latching element is in interaction immediately with the blocking bolt there is no way to compass the latching system by destroying intermediate elements, because there are no intermediate elements between the latching element and the blocking bolt.

In one or more embodiments of the present invention, the latching element is a pin, engaging an opening provided in the blocking bolt. By this direct engagement of the pin into the opening the blocking bolt is latched very effective and any misuse of the locking device is avoided.

According to one or more embodiments of the present invention, a trigger element is provided to hold back the pin in the unlatched position against the pushing force of a pushing element. This arrangement allows a mechanical initiation of the activation mechanism even if a very small movement of the trigger element occurs. When the trigger element is moved, the latching element is forced into the latching position by the pushing element and the locking device is secured. So this combination of features defines an example for a latching device which is able to be activated mechanically.

According to one or more embodiments of the present invention, for improvement of the security level of the locking device an arrangement and construction of the trigger element is expedient, to release the trigger element by movement in at least one of at least two different trigger directions of trigger movement. So any handling of a third party at the housing and/or the worm wheel cover will move the trigger element in at least one of the trigger directions notwithstanding the side or direction of the attack to the housing of the locking device or the worm wheel cover.

In one or more embodiments of the invention, the latching pin has a collar for engagement with the trigger element. This engagement extends over a very short distance to get an easy release of the latching pin by any small movement of the trigger element.

According to one or more embodiments of the present invention, advantageously, the trigger element is fixed at the housing or, alternatively, is part of the housing. So any movement of the housing releases immediately the latching element.

According to one or more embodiments of the present invention, the trigger element is coupled to the worm wheel cover. For example a longitudinal trigger element can extend through a hole in the worm wheel cover. By moving or deforming the worm wheel cover the trigger element will then be moved, i.e. by abutting the wall of the hole or by another coupling interaction.

According to one or more embodiments of the present invention, advantageously, the pushing element comprises a spring or is a spring. This is a simple possibility to achieve a "trap function" which can be maintained in tense condition with a long duration of live without tiredness.

BRIEF DESCRIPTION OF THE DRAWINGS

Embodiments of the invention are shown in the drawings and described with respect to the following figures.

DETAILED DESCRIPTION

Embodiments of the invention will be described below with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
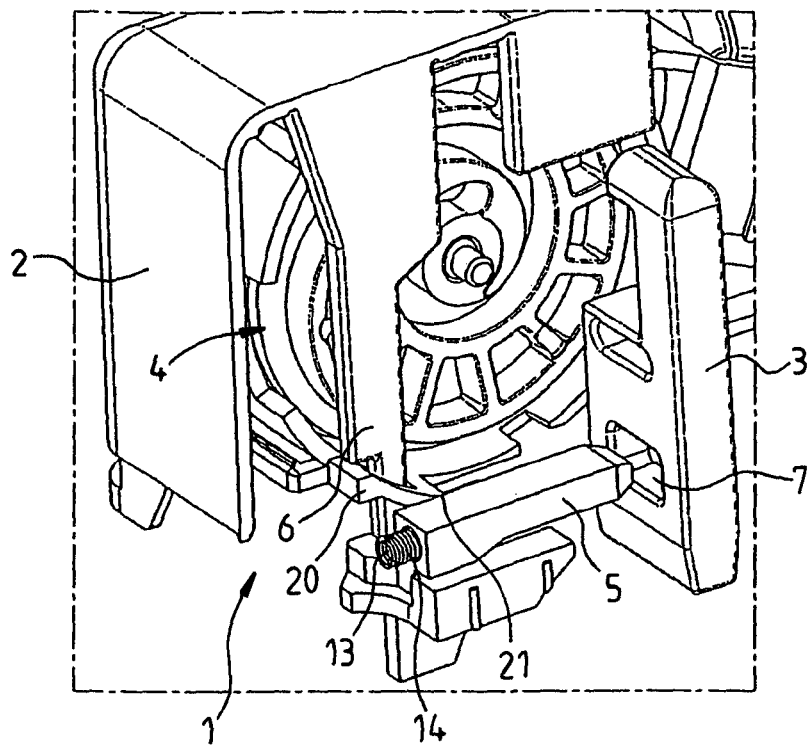
FIG. 1 shows a perspective view to a worm wheel of a locking device for a motor vehicle with a latching system according to one or more embodiments of the invention.
Figure 3:
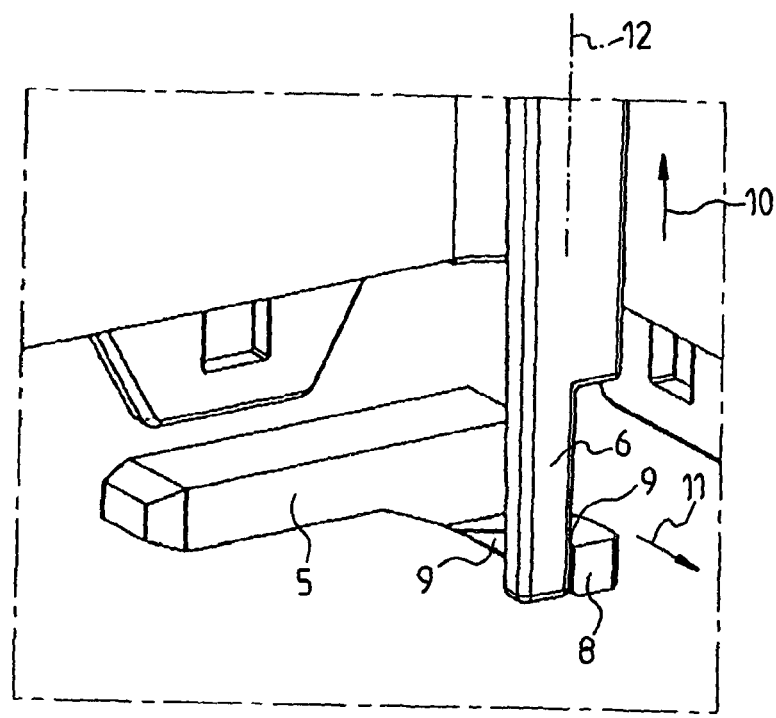
FIG. 3 shows a perspective representation of the engagement between trigger element and latching pin.
Figure 4:
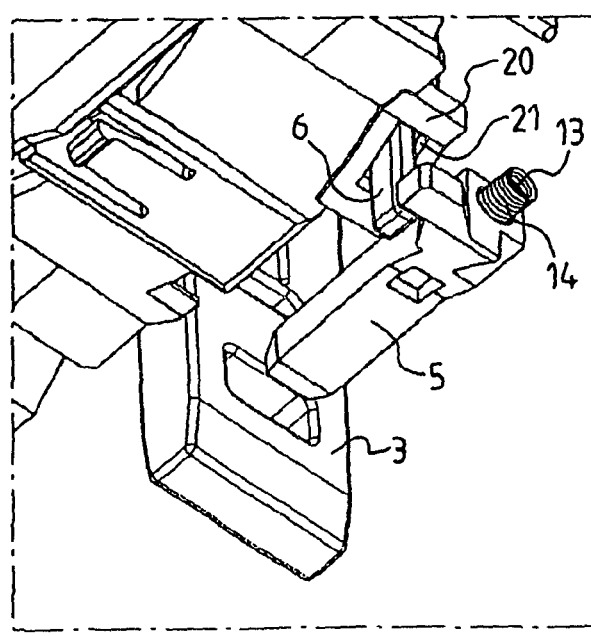
FIGS. 4 and 5 show different perspective views to the latching systems according to the preceding figures in different viewing directions.
Figure 5:
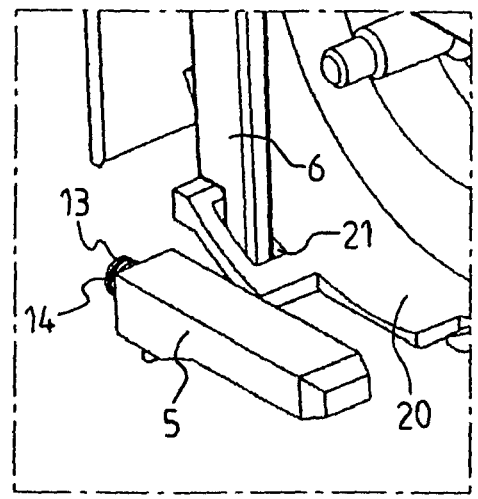

In perspective representation according to FIG. 1 the locking device 1 and parts of the housing 2 are shown. The blocking bolt 3 is drawn without its holding and guiding element. The blocking element 3 is driven by a drive 4 in form of a worm wheel. A latching pin 5 is arranged in front of an opening 7 in the blocking bolt 3. A trigger element 6 is in contact with the face of contact 9 of the latching pin 5 during the regular operation mode (see FIG. 3). The arrows 10 and 11 in FIG. 3 illustrate two directions of trigger movement, by which the trigger element 6 and the latching pin 5 come out of engagement.

One trigger movement 10 follows a longitudinal axis of the trigger element 6, wherein the other trigger movement 11 is across to this longitudinal axis 12.

Figure 2:
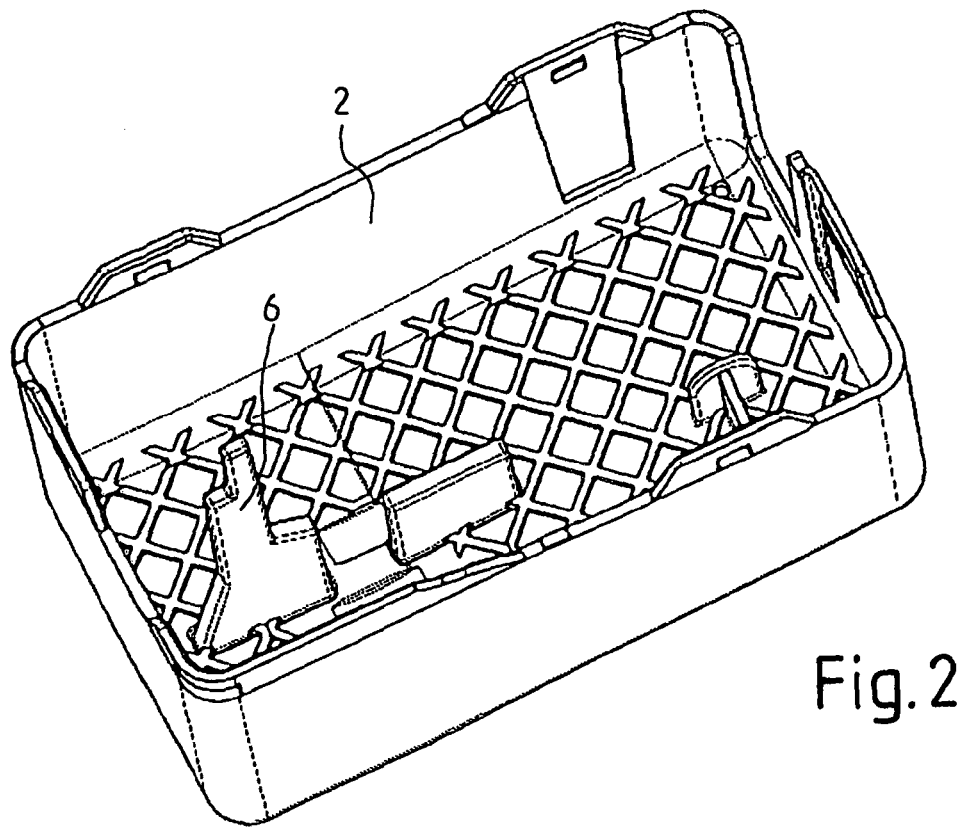
FIG. 2 shows a perspective view to the inside of the housing of a locking device.

In FIG. 2 it is illustrated, that the trigger element 6 is molded with the housing 2. Because in one or more embodiments of the present invention, the trigger element 6 and the housing 2 are one piece, any movement or handling of the housing 2 will move the trigger element 6.

Furthermore the trigger element 6 projects through a hole 21 of the worm wheel cover 20. So if one of the walls of the hole abuts to the trigger element 6, the trigger element 6 is moved and the latching pin is released.

A pushing element 13 in form of a spring 14 is provided at the latching pin 5. The spring 14 is tensed in the regular operation mode of the locking device, when the latching pin is in the position according to FIG. 1.

Figure 6:
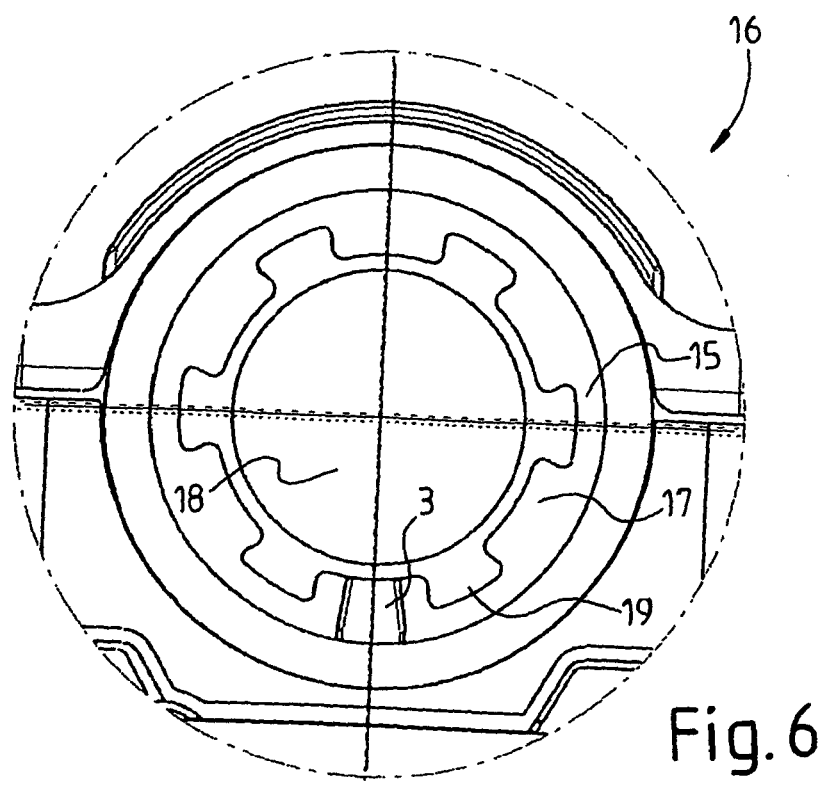
FIG. 6 shows a schematic cross section of the steering wheel column for imagination of the blocking engagement of the blocking bolt in the groove collar and FIGS. 7a and 7b show perspective views of one or more embodiments of the present invention.

If the trigger element 6 is moved out of engagement with the latching pin 5, the spring 14 pushes the latching pin 5 into the opening 7 of the blocking bolt 3, when the blocking bolt 3 is in its blocking position according to FIG. 6. In FIG. 6, a cross section of the steering wheel column is shown illustrating the groove collar 15 and the blocking bolt 3 in the blocked position inside one of the grooves 17. In this position of the blocking bolt 3 the steering wheel shaft 18, which carries the groove collar 15 is blocked against any steering rotation.

If the blocking bolt 3 is in the blocking position the latching pin 5 will latch the blocking bolt 3 by any movement of the trigger element 6, which means by any manipulation of the housing 2 or the worm wheel cover 20.

If the blocking bolt 3 abuts to a tooth 19 of the groove collar when the steering wheel column is locked the blocking bolt 3 will engage into the next groove 17, when the steering wheel shaft is rotated. The blocking bolt 3 is therefore driven by a spring member (not shown). At the moment, when the blocking bolt 3 comes into the blocking position according to FIG. 6 inside the groove 17, the latching pin 5 will latch the blocking bolt 3 by the tension of the spring 14, when the trigger element 6 is moved out of the regular operation position.

Figure 7:
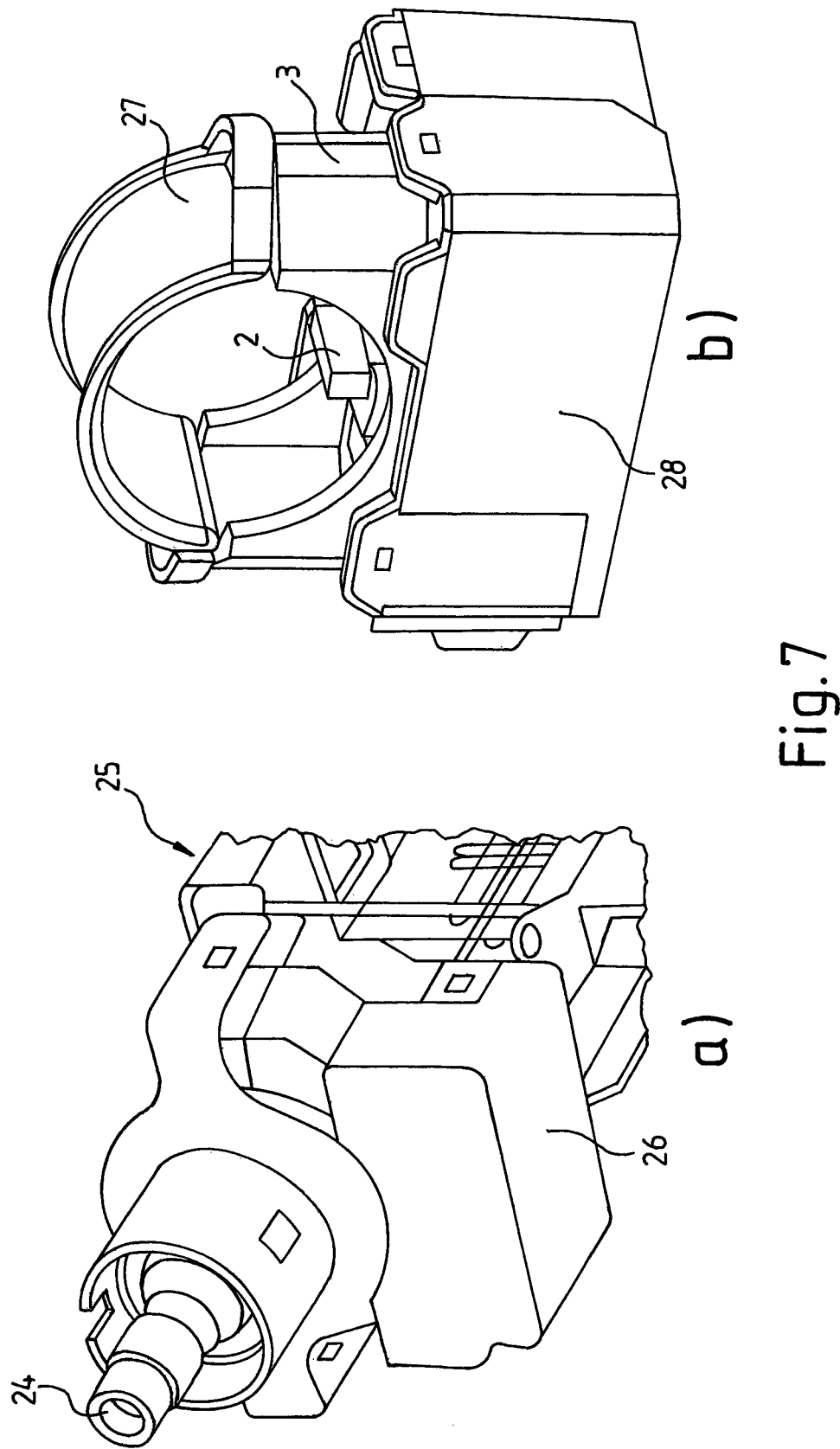

FIG. 7a is a schematic view of one or more embodiments of the invention.

Steering lock device is fixed to a steering column 25 with a bolted clump 27. Steering lock device is partly covered with a trim cover 26 formed by plastic. The trim cover 26 is fixed to a housing 28 with clicks (not shown) and removable from the housing 28 with their elasticity shown in FIG. 7b.

The steering lock device has a blocking bolt 3 that forms locking condition and unlocked condition. The bolt is inserted to a channel (not shown) of a steering shaft 24 when it forms locking condition.

So one or more embodiments of the invention gives an improvement against thief attacks trying to remove or to destroy or to deform the housing 2 or the worm wheel cover 20.

The housing itself must not protect the locking device 1. Since the housing 2 is a separate part of the steering wheel column and all latching members according to one or more embodiments of the invention are integrated into the steering wheel column the production of the housing is much easier, i.e. the housing can be made of plastics or the like.

While the invention has been described with respect to a limited number of embodiments, those skilled in the art, having benefit of this disclosure, will appreciate that other embodiments can be devised which do not depart from the scope of the invention as disclosed herein.

The invention claimed is:

1. A locking device for a motor vehicle having a steering wheel column, comprising:
   a housing;
   a worm wheel cover;
   a blocking bolt that locks a steering wheel shaft in the steering wheel column, wherein the blocking bolt is movable between a first and a second position;
   a drive that moves the blocking bolt from the first position to the second position;
   a latching element that latches the blocking bolt;
   a mechanical activation mechanism that activates the latching element, and that comprises a trigger element; and
   a pushing element,
   wherein, in the first position, the blocking bolt is in blocking engagement with the steering wheel shaft,
   wherein, in the second position, the blocking bolt is disengaged from the steering wheel shaft,
   wherein the latching element comprises a pin, and an opening is disposed in the blocking bolt for engagement with the pin,
   wherein the trigger element holds back the pin in an unlatched position against the pushing force of the pushing element,
   wherein the latching element is activated when the housing and/or the worm wheel cover is manipulated, and
   wherein the latching element is activated to move from the second position to the first position by movement of the trigger element in at least one of at least two different trigger directions.

2. The locking device according to claim 1, wherein the trigger element is fixed on the housing, or is part of the housing.

3. The locking device according to claim 1, wherein the trigger element is coupled to the worm gear cover.

4. The locking device according to claim 1, wherein the trigger element projects through a hole formed in the worm wheel cover.

5. The locking device according to claim 1, wherein the pin comprises a collar that engages with the trigger element.

6. The locking device according to claim 1, wherein the pushing element is a spring.

* * * * *